Dec. 20, 1932.   H. WITTENBERG   1,891,298
SINTERING APPARATUS
Filed Nov. 24, 1931

Inventor:
Herbert Wittenberg,
By Byrnes, Townsend & Potter,
Attorneys.

Patented Dec. 20, 1932

1,891,298

UNITED STATES PATENT OFFICE

HERBERT WITTENBERG, OF SCHONBERG NEAR KRONBERG IN TAUNUS, GERMANY, ASSIGNOR TO AMERICAN LURGI CORPORATION, OF NEW YORK, N. Y., A CORPORATION OF NEW YORK

SINTERING APPARATUS

Application filed November 24, 1931, Serial No. 577,143, and in Germany December 5, 1930.

The present invention relates to an improvement in sintering apparatus, such as Dwight & Lloyd apparatus, in which movable receptacles or pallets connected together in endless succession travel, continuously in an upright position, on upper tracks, and are then turned upside down and returned in the opposite direction, below the tracks. The downward movement of the pallets at the one end, takes place over a curved rail, the upward movement at the other end over the periphery of sprocket-wheels, arranged inside the chain of pallets, in such a way that their teeth engage the wheels of the pallets.

A disadvantage of chains of pallets working in this manner lies in the fact, that at the point where the rising pallets are returned into the upright position and, on being released by the sprocket-wheels, and guided into the horizontal line of the upper tracks, said pallets are exposed to heavy wear, inasmuch as at that point the front of each succeeding pallet touches the back-plate of the preceding pallet and, in passing over into position on the horizontal upper rail track, scrapes slowly down said back-plate, until it has, in turn, also been brought into the straight horizontal line. This scraping of the front end of the succeeding pallet over the back-plate of the preceding one, at this part of the track, naturally entails a heavy wear and tear of the back-plates of the pallets, and considerable friction of the pallets themselves.

It often happens, that a pallet which is "riding" on a preceding one, fails to slip down promptly into the horizontal position, so that occasionally several pallets in succession are pushed forward, through a larger or smaller distance on the track, in a tilted position. The result is that, underneath the charging device, particles of the charge may drop into the angular gaps left between the tilted pallets, thereby preventing the pallets from fitting in close succession, so that undesirable air is drawn through the interstices. Occasionally pallets even get as far as the suction zone while still in the tilted position, thus again allowing the admission of undesirable air.

Various proposals have already been made with a view to straightening out the rising pallets in due time, in order that the pallet entering the horizontal position may not press against the preceding pallet until it has, itself, already assumed the horizontal position.

A known proposal is directed to obviating, by means of the sprocket-wheels, the inconvenience caused by pallets riding on one another when entering the horizontal track. Usually, the sprocket-wheels correspond to the curved rail at the ascending end, the sprocket teeth engaging the wheels of the pallets inside the curve, and thus enabling the latter to be lifted as far as the horizontal line of the upper tracks. According to the above known proposal however, the sprocket-wheels are placed in a more inward position, in such a manner that the sprocket teeth engage the wheels of the pallet which has just turned into the upper horizontal line, as well as the wheels of that pallet, which is just leaving the horizontal line of the lower track and about to enter the curve on the rising end. In the curve itself, the pallets are travelling free, being moved up the curve solely by the pressure of the pallet that is just leaving the horizontal lower track under the action of the sprocket-wheels. By arranging the sprocket-wheels in this manner a gap is formed between the first pallet entering the upper horizontal track, under the action of the sprocket-wheels, and the next succeeding pallet, the result being to prevent the next ascending pallet from "riding" during its descent into the horizontal, on the back-plate of the preceding one, which is already in the horizontal position.

According to another proposal a resiliently mounted pressure-wheel acting by means of a spring is fitted at the place where the pallet is about to turn into the horizontal line, said wheel pressing, from above, against the upper edge of the pallets in such a manner, that the front ends of the rising pallets are kept down, that is their rear ends are raised, to such an extent, as to prevent the front end of a pallet from "riding" on the back-plate of the preceding one.

The same effect as in the last described arrangement is attained by another proposal, which provides an upwardly acting pressure device driven by the sprocket-wheels. For this purpose a pair of cams are fitted on the shaft of the sprocket-wheels, and actuate a roller mounted on the lower end of a pair of struts. Each of these struts is rigidly connected to a pivotally mounted lever-arm, another roller being mounted on their upper ends. The cams on the shaft of the sprocket-wheels are so arranged, that, at the moment when a sintering truck is about to reach the top of the sprocket-wheels, a pair of cams have reached a position immediately in front of the roller. As the sprocket-wheels continue their rotation the lever-rods are raised by the cams to a height corresponding to the throw of the cams, thus causing the roller at the upper end of the struts to press against the bottom of the passing pallet and raise its rear end accordingly, into the position in which the pallet can be moved forward on the horizontal track, by the teeth of the sprocket-wheels.

The aforesaid proposals, however, require complicated devices and moreover,—especially the two last mentioned which operate on substantially the same principle—are not absolutely reliable.

The present invention is also designed to level out the pallets in advance, at the moment of their passage from the curve of the track into the horizontal portion of the upper track. The means of attaining this in accordance with the invention, are however, far simpler than those hitherto proposed and are also absolutely reliable.

In order more clearly to understand the nature of the present invention reference is made to the accompanying drawing, which illustrates diagrammatically and by way of example a typical embodiment of the invention, and in which:—

Figure 1:
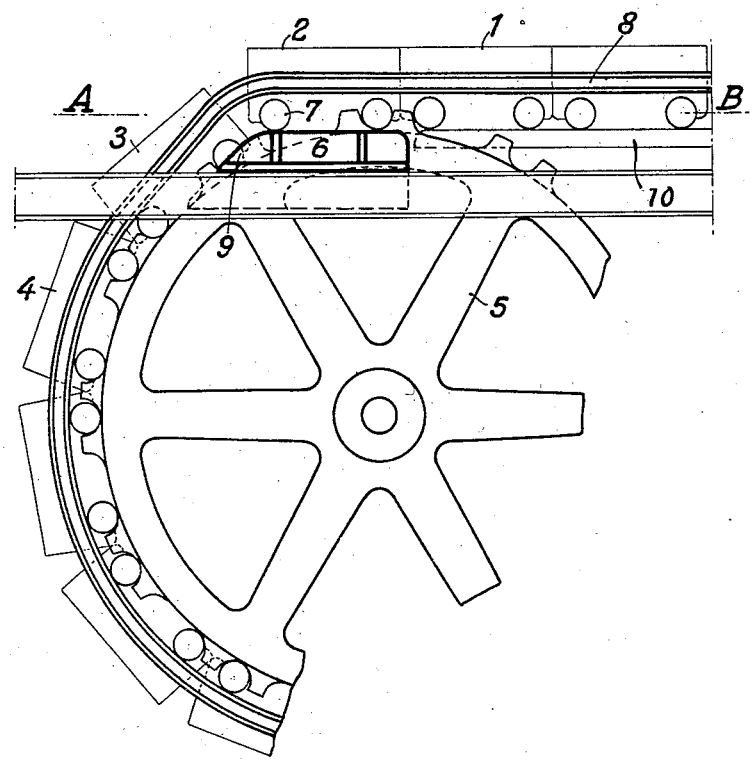
Fig. 1 is a side elevation of the device according to the invention.

In the drawing: 1, 2, 3, 4, etc. are the sintering pallets following each other in an endless chain, and being moved forward by the sprocket-wheels 5. According to the invention curved rails 6 are mounted in a fixed position on both sides of the sprocket-wheels 5. At the same time the treads of the back wheels 7 of each truck are widened.

The operation of the invention will now be explained with reference to the pallets 1, 2, and 3 shown in Fig. 1.

Figure 2:
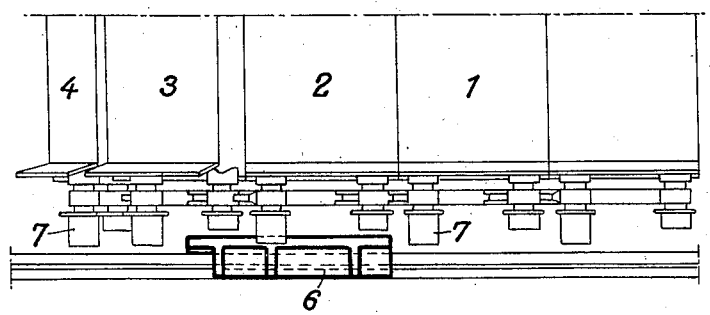
Fig. 2 is a cross-section on the line A—B of Fig. 1.

The pallet 3 is about to pass from the sprocket-wheels 5 and the track 8 to the upper horizontal track 10. Whereas its front wheels, the treads of which are of normal width, slip past the curved rail 6, the back wheels, the treads of which are widened for the purpose, are engaged by that rail and are raised, in advance, by means of its oblique surface 9. The pallet No. 2 (Fig. 2) clearly shows how the back wheels run up on the curve, and how the pallet is thus brought, in advance, in the same horizontal position as the one in front.

I claim:—

1. An improved sintering apparatus having guiding means including an upper horizontal track upon which pallets travel in an endless chain, actuating means to move said pallets on said guiding means, and leveling means for said pallets, said leveling means comprising a fixed curved rail at the entrance end of the upper horizontal track and widened treads on the rear wheels of the pallets to engage with said rail.

2. A pallet for use in sintering machines, said pallet comprising a body supported by a plurality of pairs of wheels, and pallet leveling means, said leveling means comprising extended portions on the rear wheels.

3. In a sintering machine of the type having a plurality of pallets adapted to travel in an endless chain, an upper horizontal track for said pallets and pallet leveling means, said means comprising a curved rail at one end of said track.

4. An improved sintering apparatus having guiding means including an upper horizontal track upon which the pallets travel in an endless chain, actuating means to move said pallets on said guiding means, and leveling means for said pallets, said leveling means comprising a fixed curved rail at each side of the entrance end of the upper horizontal track and widened treads on the rear wheels of the pallets to engage with said rail.

In testimony whereof, I affix my signature.

Dr. HERBERT WITTENBERG.